(No Model.) 3 Sheets—Sheet 1.
J. C. FORD.
MACHINE FOR SPLITTING AND REWINDING ROLL PAPER.
No. 466,228. Patented Dec. 29, 1891.
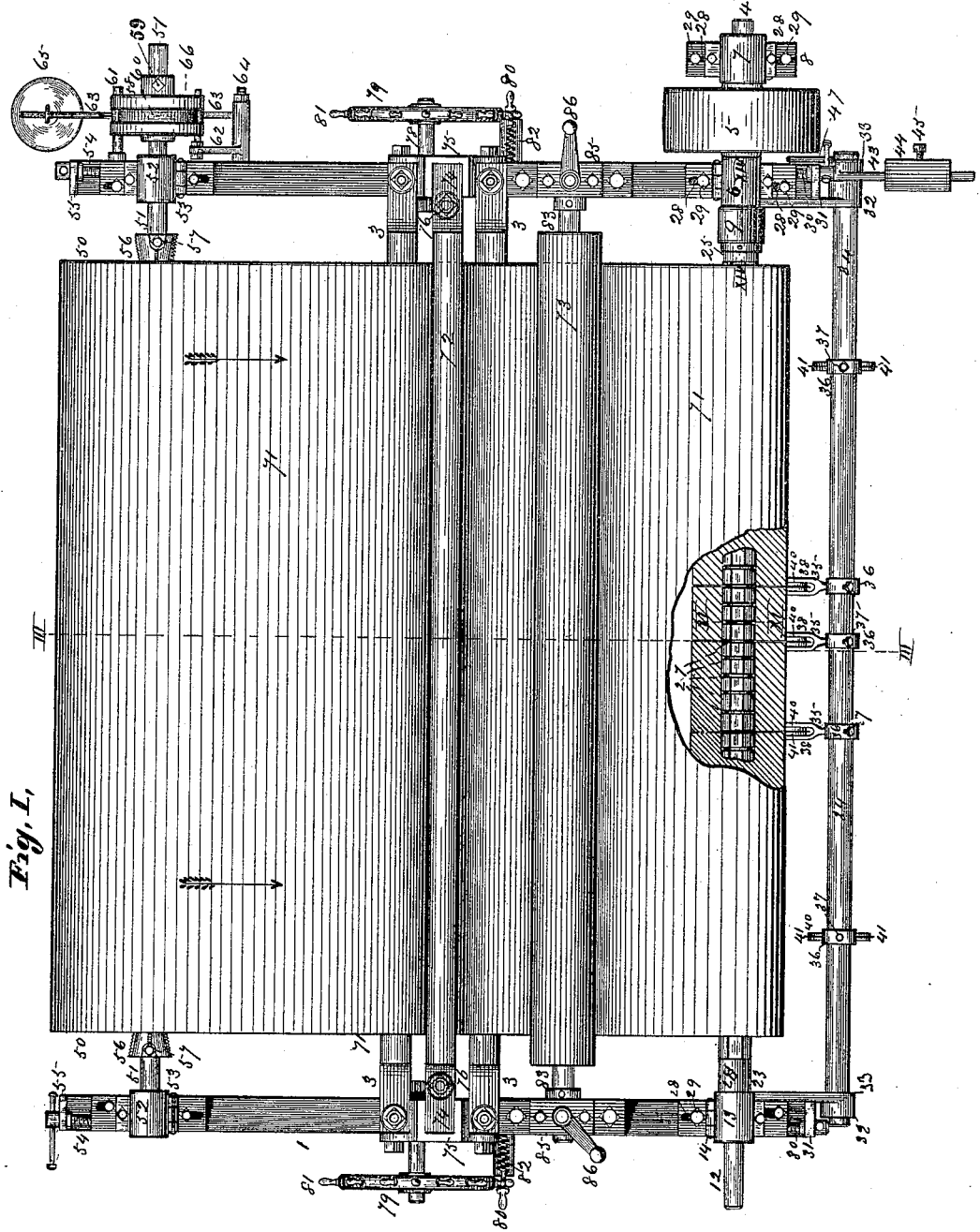
Fig. I.
Attest:
E. Arthur
Edward Oten
Inventor:
John C. Ford.
By Knight Bros
Attys.

(No Model.) 3 Sheets—Sheet 2.
J. C. FORD.
MACHINE FOR SPLITTING AND REWINDING ROLL PAPER.
No. 466,228. Patented Dec. 29, 1891.
*Fig. II.*
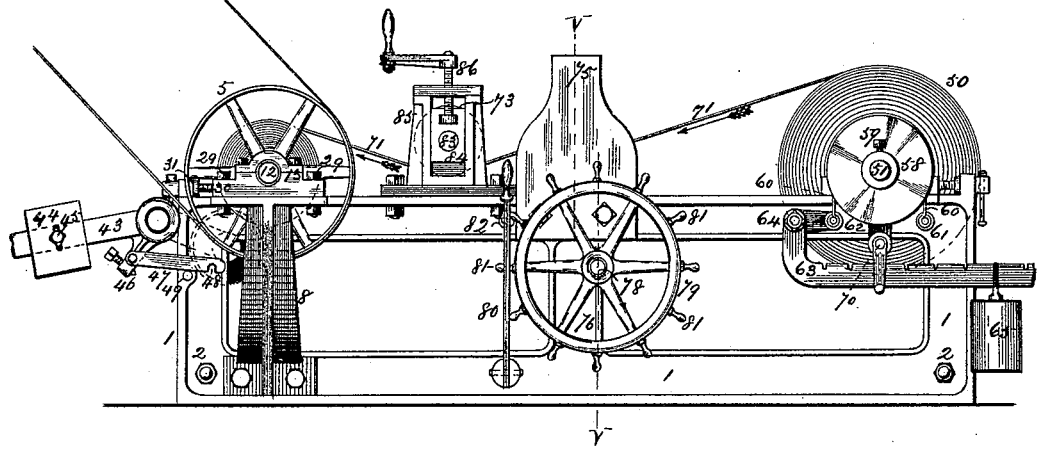
*Fig. III.*
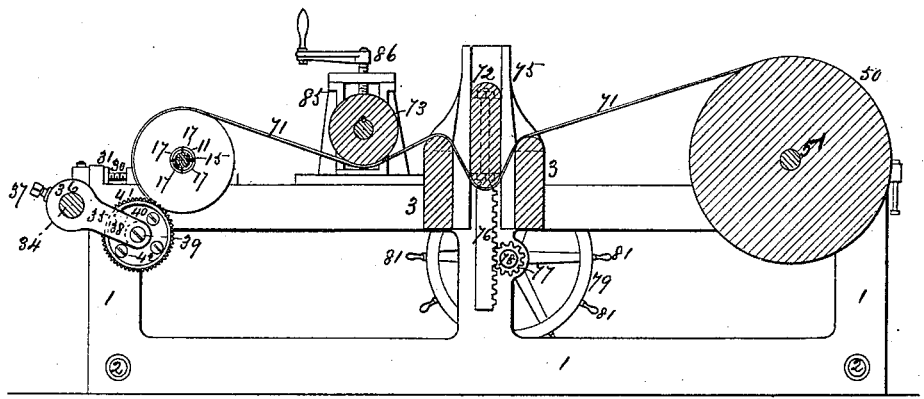
*Fig. IV.*
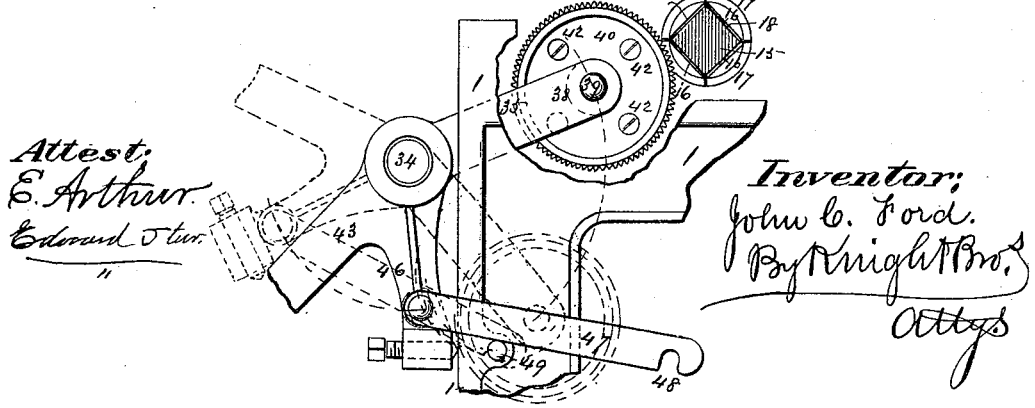
Attest:
E. Arthur
Edward Stur
Inventor:
John C. Ford.
By Knight Bros.
Attys (No Model.) 3 Sheets—Sheet 3.
J. C. FORD.
MACHINE FOR SPLITTING AND REWINDING ROLL PAPER.
No. 466,228. Patented Dec. 29, 1891.
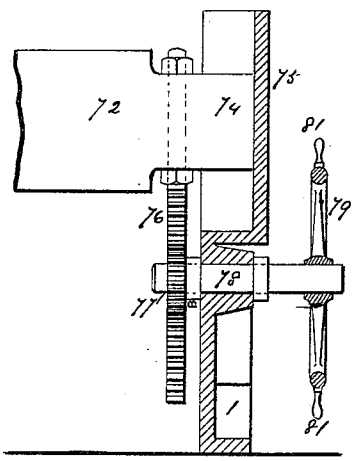
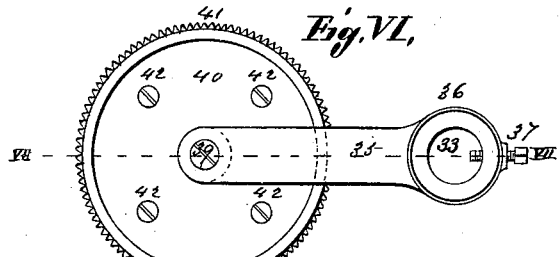
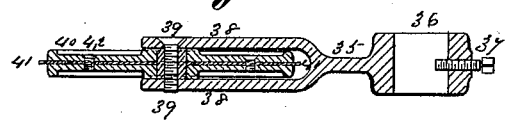
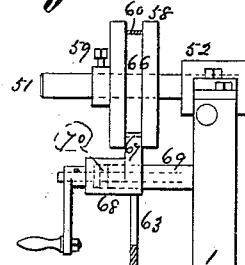
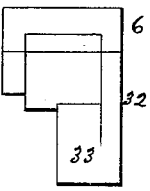
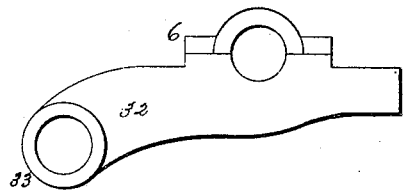
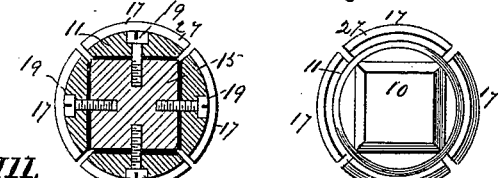
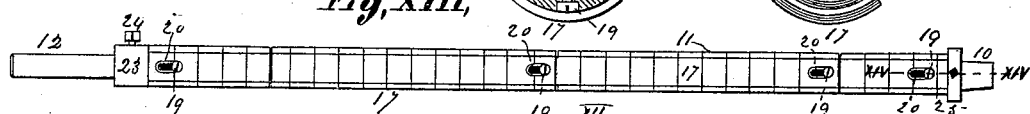
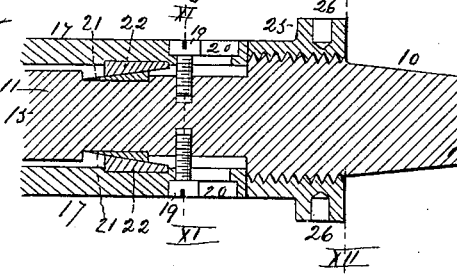
Attest:
E. Arthur
Edward Stew
Inventor:
John C. Ford.
By Knight Bro.
Attys.

UNITED STATES PATENT OFFICE.

JOHN C. FORD, OF BEVERLY, MISSOURI, ASSIGNOR TO WILLIAM REES & CO., OF KEOKUK, IOWA.

MACHINE FOR SPLITTING AND REWINDING ROLL-PAPER.

SPECIFICATION forming part of Letters Patent No. 466,228, dated December 29, 1891.

Application filed June 12, 1888. Serial No. 276,799. (No model.)

*To all whom it may concern:*

Be it known that I, JOHN C. FORD, of Beverly, in the county of Macon and State of Missouri, have invented a certain new and useful Machine for Splitting and Rewinding Roll-Paper, of which the following is a full, clear, and exact description, reference being had to the accompanying drawings, forming part of this specification.

This is a machine by which a mill-roll is unwound and is rewound upon another roll and at the same time cut into narrower widths. The rewinding-shaft has circumferential grooves to allow the edges of the cutters to pass through the paper, and is constructed for diametric contraction to allow of the easy removal of the rolls from it.

Figure I is a plan of the machine with part in horizontal section. Fig. II is a side elevation. Fig. III is a longitudinal section at III III, Fig. I. Fig. IV is a detail elevation showing one of the rotary cutters with its supporting-arm, &c., the winding-shaft being in transverse section. The full lines show the parts in position for the beginning of the rewinding of the paper and the broken lines indicate the position of the parts after the rewinding has been completed. Fig. V is an enlarged detail section at V V, Fig. II. Fig. VI is a side view of one of the rotary cutters and its supporting-arm. Fig. VII is a section at VII VII, Fig. VI. Fig. VIII is a detail front elevation showing the means for the endwise adjustment of the mill-roll shaft. Fig. IX is an end elevation of one of the brackets supporting the rod on which the cutter-arms are sustained. Fig. X is a side elevation of the bracket. Fig. XI is a transverse section of the winding-shaft at XI XI, Figs I and XIV. Fig. XII is an end view of the winding-shaft with the screw collar or nut removed. Fig. XIII is a side view of the winding-shaft. Fig. XIV is an enlarged detail longitudinal section of the winding-shaft at XIV XIV, Fig. XIII.

The sides of the main frame are seen at 1. They are secured together by transverse bars 2 and 3.

4 is the drive-shaft carrying a belt-pulley 5 to receive a drive-belt. The shaft 4 has bearing in boxes 6 and 7. The box 6 is secured to one of the sides of the main frame and the box 7 to a bracket 8, attached to this side. The shaft 4 has a socket 9 formed to receive the frusto-pyramidal end 10 of the rewinding or expansion shaft 11. The construction is such that when the end 10 is within the socket the rewinding-shaft is forced to turn with the drive-shaft. The rewinding-shaft has a round end 12 turning in a journal-box 13 on one side of the main frame. The end 12 extends beyond the journal-box to give means for lifting that end of the shaft.

The cap of the box 13 is hinged at 14, so that it may be thrown back to allow the removal of the shaft. It will be seen that when the cap of the box 13 is thrown back that end of the shaft may be lifted from the box and the end 10 drawn out of the socket 9. The middle part of the rewinding or expansion shaft 11 (or that part upon which the paper rolls are wound) has an interior or central portion 15, which is square in cross-section and of equal size from end to end, the opposite sides 16 being parallel to each other. To each side 16 is fitted a strip 17, whose inner sides 18 are parallel with the sides 16 of the central portion. The outer sides of the strips 11 are so curved or convexed that when they are in their outer position they form together a true cylinder concentric with the axis of the shaft. The surface strips 17 are connected to the shaft by screws 19, which pass through counterbored slots 20, the screw-heads occupying the counterbores and not projecting beyond the outer face of the strips 17. The strips 17 thus have endwise movement on the core 15 of shaft 11.

At 21 are inclines on the part 15 of the shaft 11, and at 22 are inclines on each of the strips 17. In a long winding-shaft there may be three or more sets of these inclines—say one set near each end and one set at the middle. These inclines bear upon each other, so that when the strips are moved toward the end 10 they will be forced outward as far as the screws permit.

23 is a collar fitting the end 12 of the shaft 11 and held in place by a set-screw 24. The ends of the strips abut against this collar, and thus the strips are restrained from endwise movement and held in their position, as seen in Fig. XIV. The other ends of the strips 17 bear against a screw collar or nut 25, which screws upon the shaft. (See Figs. I and XIV.) When it is desired to place the strips 17 in their inner position, the shaft 11 is removed from the machine, the collar 23 made loose, and the nut 25 screwed inward to push the strips toward the end 12. This relieves the bearing of the inclines 21 and 22 and the strips approach the part 15, thus decreasing the diameter of the shaft 11, composed of the part 15 and strips 17. This position of the strips is shown in Fig. XIII. When winding the rolls of paper upon the winding-shaft 11, the shaft has its larger diameter. To allow the easy removal of the paper rolls from the shaft, it is contracted to its smaller diameter, as described, when it may be easily drawn from the rolls. The nut has holes 26 for the application of a wrench, by which it may be turned. The strips 17 have circumferential grooves 27 to receive the edge of the cutters, by which the broad roll of paper is cut into narrow rolls. The boxes 6, 7, and 13 are shown to be longitudinally adjustable by means of the slots 28, through which pass the attaching screw studs or bolts 29. At 30 are screws turning in lugs 31 upon the side pieces 1, the ends of the screws screwing into the boxes.

32 are brackets attached to the boxes 6 and 13 and having at their outer ends eyes 33, through which passes a shaft 34. The cutter-arms 35 are strung on this shaft. The eyes 36 of the cutter-arms have set-screws 37, which may be made to bear on the shaft 34 and hold the arms in position upon the bar. The arms 35 are forked at 38, and within the fork is the rotary cutter, which turns on an arbor 39, passing through the ends of the fork. The cutter consists of two disks 40, with a circular knife 41 of thin steel interposed between them.

At 42 are screws by which the disks are fastened together. The edge 42 of the cutter is preferably serrated.

In order to press the cutters upward toward the winding-shaft 11, a weighted arm 43 is attached to the shaft, the weight 44 sliding on the shaft and being held in place by a set-screw 45. (See Figs. I, II, and IV.) The construction is such that the pressure of the cutters against the paper may be regulated by moving the weight on the arm. The arm has a downward projection or arm 46, in which turns a screw whose point bears against the frame 1 when the cutter is in its upper position, and thus prevents the cutter from coming in contact with the winding-shaft. This position of the parts is shown in full lines in Fig. IV. To sustain the bar 34 in its highest position and hold the cutters in their lower position, a drop-latch 47 is pivoted to the arm or projection 46, said latch having a notch 48 upon the lower edge at its free end, in which notch engages a stud or pin 49, projecting from the main frame. By this means the cutters are held out of contact with the rolls of paper while the winding-shaft is being removed from its bearings for the removal of the rewound rolls of paper therefrom.

The means for supporting and adjusting the mill-roll 50 will now be described.

51 is a shaft, which is passed axially through the mill-roll and which has bearings in the boxes 52. These may be thrown back and the shaft lifted from its bearings for insertion in a mill-roll. The boxes are attached to the frame in a similar way to the boxes 6 and 13, so as to allow their longitudinal adjustment, and, like said boxes, they are connected by screws 54 to lugs 55 upon the main frame, so that by turning the screws either or both ends of the mill-roll shaft may be moved outward or inward.

56 are conical collars, which slide on the shaft 51, and which are forced into the ends of the axial passage through the roll and serve to center the roll and to hold it firmly upon the shaft, the collars being held in place by set-screws 57.

58 is a pulley upon the shaft 51, said pulley being secured on the shaft by a set-screw 59.

60 is a brake-strap, which bears on the surface of the pulley. One end of the strap is attached to the main frame at 61 and the other end to the arm 62 of the weighted lever 63, which is fulcrumed to the main frame at 64, and which carries a weight 65, that is capable of sliding on the horizontal arm of the lever, so as to adjust the pressure of the brake upon the pulley. (See Figs. I, II, and VIII.)

In order to prevent the endwise movement of the mill-roll shaft and to give means for the endwise adjustment of the shaft, a projecting lip 67 of a sliding block 68 is constructed to engage in a circumferential groove 66 of the pulley. The block 68 works on a guide 69 and carries a hand-screw 70, which turns in bearings of the block and screws into the guide, so that by turning the hand-screw the block 68 is moved inward and outward, and with it the pulley 58 and mill-roll shaft. From the mill-roll the paper 71 passes to and over the top of one of the fixed tension-bars 3, which may be of wood or of metal. The tension-bars 3 are rounded at the upper edge to avoid injury to the paper. Between the two fixed tension-bars 3 is a movable tension-bar 72, which may be similarly formed in every respect to the bars 3, but with the under edge rounded, as this is the edge against which the paper bears. The bar 72 is rounded at the lower edge for the avoidance of injury to the paper. From the under side of the bar 72 the paper passes to and over the other fixed bar 3, from that to and beneath a roller 73, and from that to the winding-shaft 11. The bar 72 and roller 73 are made vertically adjustable by independent adjusting devices at the sides of the machine, so that not only can the tension upon the paper be increased by moving the bar 72 downward, but in case the paper on the mill-roll should bag in any degree at one edge by lowering that end of the roller 73 the tension may be equalized across the paper.

The ends of the bar 72 are moved vertically by the following devices: The ends 74 of the bar have bearing in vertical guides 75. At each end of the bar 72 is a depending cog-rack 76, which engages with a cog-wheel 77 upon a shaft 78, carrying a hand-wheel 79. (See Figs. I, II, III, and V.) It will be seen that by turning the hand-wheel the bar may be raised or lowered. 80 is a locking-lever having a notch or catch adapted to engage either of the handles 81 of the hand-wheel 79 and hold the wheel in any position in which it may be placed. 82 is a spring drawing the locking-lever inward to the hand-wheel. (See Figs. I and II.) The gudgeons 83 of roller 73 have bearing in boxes 84, working in vertical guides or housings 85. 86 are hand-screws threaded in the tops of the housings and having bearing at the lower ends in the boxes 84.

The operation of the machine is as follows: The mill-roll shaft 51 is removed from its bearings 52 and inserted in the mill-roll and the cones 56 forced into the axial openings and the set-screws 57 screwed tight. The shaft 51 is then placed in its bearings. The paper is passed from the roll beneath one fixed bar 3, under the movable bar 72, over the other bar 3, beneath the roller 73, and to the winding-shaft 11. The rotary cutters have been placed in the proper position on the shaft 34, so that the cutting-edges 41 will enter one of the circumferential grooves 27 of the winding-shaft. Any unused cutters may be allowed to hang vertically on the shaft 34. The machine may now be put running and the paper will be wound on the rewinding-shaft and at the same time cut by the cutters. As the diameter of the paper rolls upon the rewinding-shaft increases the peripheries of the disks 40 bear against the paper roll and the cutters are thus gradually forced downward, the weighted arm 43 being lifted. When sufficient paper has been wound on the rewinding-shaft, the machine is stopped and the winding-shaft removed from the machine. The set-screw 24 is then made loose and the nut 25 screwed forward on the shaft to cause the strips 17 to fall in and decrease the diameter of the shaft, so that the paper rolls may easily be removed from it.

This machine may be associated with a printing-press or other machine to cut the paper longitudinally, the press or other machine occupying the position of the mill-roll. In place of the nut 25 upon one end of the winding-shaft a collar may be fixed upon the shaft or a movable collar similar to the collar 23. The collar 23 may be made to screw on the shaft in place of being fixed thereon by a set-screw. The preferred construction has, however, been shown.

I claim—

1. A roll-winding shaft having a square central part with parallel sides and having flat inclines 21, and surface strips 17, having flat inclines 22, adapted to slide on the inclines 21, and screws threaded in the central part or core and extending through longitudinal slots in the strips 17, substantially as and for the purpose set forth.

2. The combination, in a winding-shaft, of a central part 15, surface strips 17, having longitudinal slots, the flat matching inclines 21 22 under the said strips, the former 21 being adapted to slide on the latter 22, the retaining-screws 19, screwed in the central part of the shaft and occupying the said slots in the surface strips, the screw-collar 25, bearing against one end, and the collar 23, bearing against the other end of said strips, substantially as and for the purposes set forth.

3. The combination, in a roll-winding machine, of a roll-winding shaft 11, rotary cutter having bearing on an arm, shaft 34, passing through an eye 36 in the cutter-arm, and a weighted arm 43, attached to the shaft 34, substantially as and for the purpose set forth.

4. The combination, in a roll-winding machine, of the rotary cutters, arms carrying said cutters, a rock-shaft on which said arms are mounted, a weighted arm 43 on said shaft for forcing the cutters into action, having the arm 46, a latch 47, pivoted to arm 46 and having a notch 48, and a lug 49, upon which said latch normally rests and with which said notch engages, substantially as set forth.

5. The combination, in a roll-winding machine, with the fixed tension-bars 3 and the movable tension-bar 72, of a segment-rack on the bar 72, a wheel having a pinion engaging said rack, and a stop for locking said wheel, substantially as and for the purpose set forth.

6. In a roll-winding machine, the combination, with the mill-roll shaft 51, having a grooved pulley thereon, of a strap-brake secured at one end and resting in said groove, a pivoted weighted lever secured to the other end of said strap-brake, the block 68, having a lip engaging in the groove of said pulley, the guide 69, supporting said block, and a hand-screw for adjusting said block on said guide, substantially as and for the purposes set forth.

7. The combination, in a roll-winding machine, of a mill-roll shaft 51, tension-bars 3 and 72, adjustable roller 73, expanding winding-shaft 11, having circumferential grooves 27, and rotary cutter movable to and from the winding-shaft and adapted to cut the material while upon the shaft, substantially as set forth.

JOHN C. FORD.

In presence of—
EDGAR I. HAGAN,
A. J. BROWN,